United States Patent [19]
Reise et al.

[11] Patent Number: 5,905,744
[45] Date of Patent: May 18, 1999

[54] TEST MODE FOR MULTIFUNCTION PCI DEVICE

[75] Inventors: Brian G. Reise; Paul J. Smith, both of Colorado Springs, Colo.

[73] Assignee: LSI Logic Corporation, Milpitas, Calif.

[21] Appl. No.: 08/940,866

[22] Filed: Sep. 30, 1997

[51] Int. Cl.$^6$ .................................................. G06H 7/02
[52] U.S. Cl. ............................... 371/68.2; 395/185.09; 370/248; 370/250
[58] Field of Search .................................. 371/68.1, 68.2, 371/67.1, 20.1; 395/185.09, 183.19; 370/241, 242, 246, 247, 248, 250, 251, 257, 259, 260, 262, 264; 364/265, 265.1, 267

[56] References Cited

U.S. PATENT DOCUMENTS

| | | | |
|---|---|---|---|
| 4,688,222 | 8/1987 | Blum | 371/25 |
| 4,811,345 | 3/1989 | Johnson | 371/16 |
| 4,878,168 | 10/1989 | Johnson et al. | 364/200 |
| 4,964,124 | 10/1990 | Burnett | 371/15.1 |
| 5,077,689 | 12/1991 | Ahn | 365/201 |
| 5,214,655 | 5/1993 | Eichelberger et al. | 371/22.5 |
| 5,351,232 | 9/1994 | Yamashita | 370/248 |
| 5,453,990 | 9/1995 | Aoki et al. | 371/20.1 |
| 5,497,379 | 3/1996 | Whetsel | 371/22.3 |
| 5,574,945 | 11/1996 | Elko et al. | 395/825 |

*Primary Examiner*—Trinh L. Tu
*Attorney, Agent, or Firm*—Wayne P. Bailey; Duke W. Yee

[57] ABSTRACT

In a multifunction PCI device containing identical backend functions or other large, redundant functional blocks, a single backend function is selected as a primary function while in test mode. All backend I/O channels are then simultaneously tested in parallel, with the same data and control signals from a PCI local bus being driven to all backend channels during the same test clock cycle. A single backend channel is designated as the primary for providing requisite handshaking signals during output to the backend I/O channels. Input data from each backend channel is received in parallel and compared, with miscompares being flagged to allow testing of the input data path from the respective backend I/O channel. Only signals from the primary backend I/O channel are designated for transmission to the PCI local bus. Signals from the remaining backend channels are received in parallel with and compared to the signals from the primary channel, and miscompare flags are generated for any discrepancies identified. The resulting parallel testing of all backend I/O channels within the multifunction device reduces the number of test vectors needed to achieve fault grade goals.

34 Claims, 3 Drawing Sheets

TEST MODE FOR MULTIFUNCTION PCI DEVICE

BACKGROUND OF THE INVENTION

1. Technical Field

The present invention relates generally to peripheral component interface device and in particular to devices providing an interface between a peripheral component interface local bus and backend channels. Still more particularly, the present invention relates to testing devices which provide an interface between a peripheral component interface local bus and backend input/output channels.

2. Description of the Related Art

Multifunction peripheral component interface (PCI) input/output (I/O) devices transfer data between a PCI local bus and backend I/O channels. Multifunction PCI devices may connect the PCI local bus to a number of backend channels, which may conform to any one of a variety of I/O standards such as small computer serial interface (SCSI), Ethernet, EIDE, etc. Each backend I/O channel may conform to the same standard, or different backend channels may employ different protocols.

Normal operation of multifunction PCI devices allows data to be transferred between the PCI interface and one channel at a time. However, achieving fault grade goals on multifunction PCI devices which have identical multiple backend I/O channels requires large numbers of test vectors. Even though each backend I/O channel will be tested with the same data pattern, there is considerable overhead required to switch between each backend function. Since only one backend function can have access to the PCI bus at any given time, arbitration logic built into the PCI interface determines which backend has this control. This arbitration sequence adds additional clock cycle delays each time a backend function requests control of the PCI bus to complete a bus transaction. The test time required to test multifunction PCI devices is directly proportional to the number of test vectors which must be run, and product cost is increased with increased testing cost.

It would be desirable, therefore, to reduce the number of test vectors required for testing a multifunction PCI device. It would further be advantageous if the reduction in test vectors could be achieved with a minimal addition of test circuitry to the device.

SUMMARY OF THE INVENTION

In a multifunction PCI device containing identical backend functions or other large, redundant functional blocks, a single backend function is selected as a primary function while in test mode. All backend I/O channels are then simultaneously tested in parallel, with the same data and control signals from a PCI local bus being driven to all backend channels during the same test clock cycle. A single backend channel is designated as the primary for providing requisite handshaking signals during output to the backend I/O channels. Input data from each backend channel is received in parallel and compared, with miscompares being flagged to allow testing of the input data path from the respective backend I/O channel. Only signals from the primary backend I/O channel are designated for transmission to the PCI local bus. Signals from the remaining backend channels are received in parallel with and compared to the signals from the primary channel, and miscompare flags are generated for any discrepancies identified. The resulting parallel testing of all backend I/O channels within the multifunction device reduces the number of test vectors needed to achieve fault grade goals.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
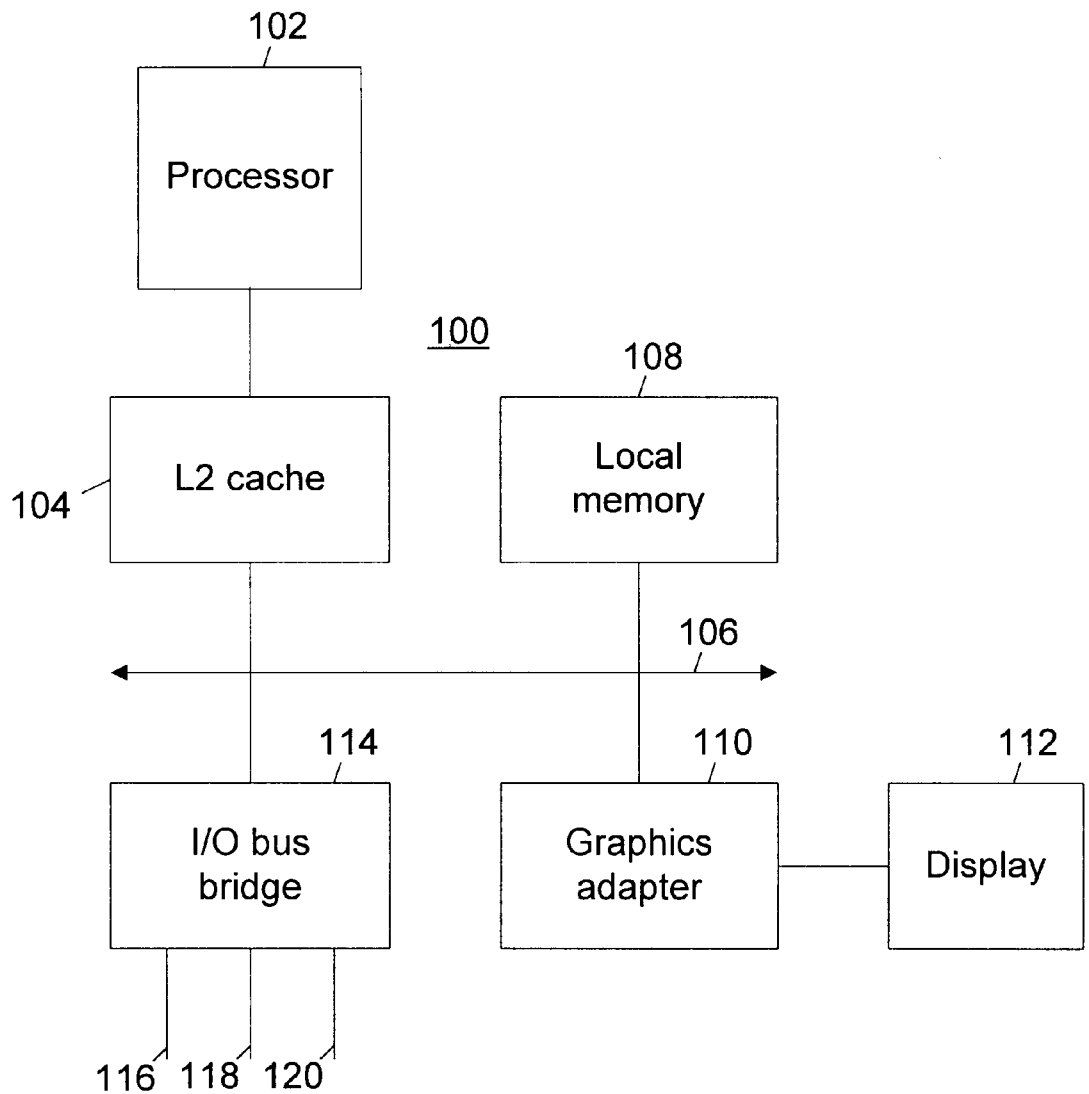
FIG. 1 depicts a data processing system in which a preferred embodiment of the present invention may be implemented.

With reference now to the figures, and in particular with reference to FIG. 1, a data processing system in which a preferred embodiment of the present invention may be implemented is depicted. Data processing system 100 includes a processor 102 connected to a level two (L2) cache 104, which is connected in turn to a PCI local bus 106. Memory 108 in the depicted example is also connected to PCI local bus 106, as is memory-mapped graphics adapter 110, which is further connected to display device 112.

Also connected to PCI local bus 106 is a bridge or multifunction PCI device 114 providing a connection between PCI local bus 106 and backend I/O channels (also referred to herein as "function I/O buses") 116–120. Backend I/O channel 1 116, backend I/O channel 2 118, and backend I/O channel n 120 in the depicted example may be SCSI, Ethernet, or EIDE buses or the like. Backend functions 116–120 may provide connections for a keyboard and mouse adapter (not shown), a local area network (LAN) adapter (not shown), or other peripheral components for data processing system 100. The embodiment depicted is presented merely for the purposes of explaining the invention and is not intended to imply architectural limitations. Those skilled in the art will recognize that many variants of the embodiment depicted may be utilized in connection with the present invention.

Figure 2:
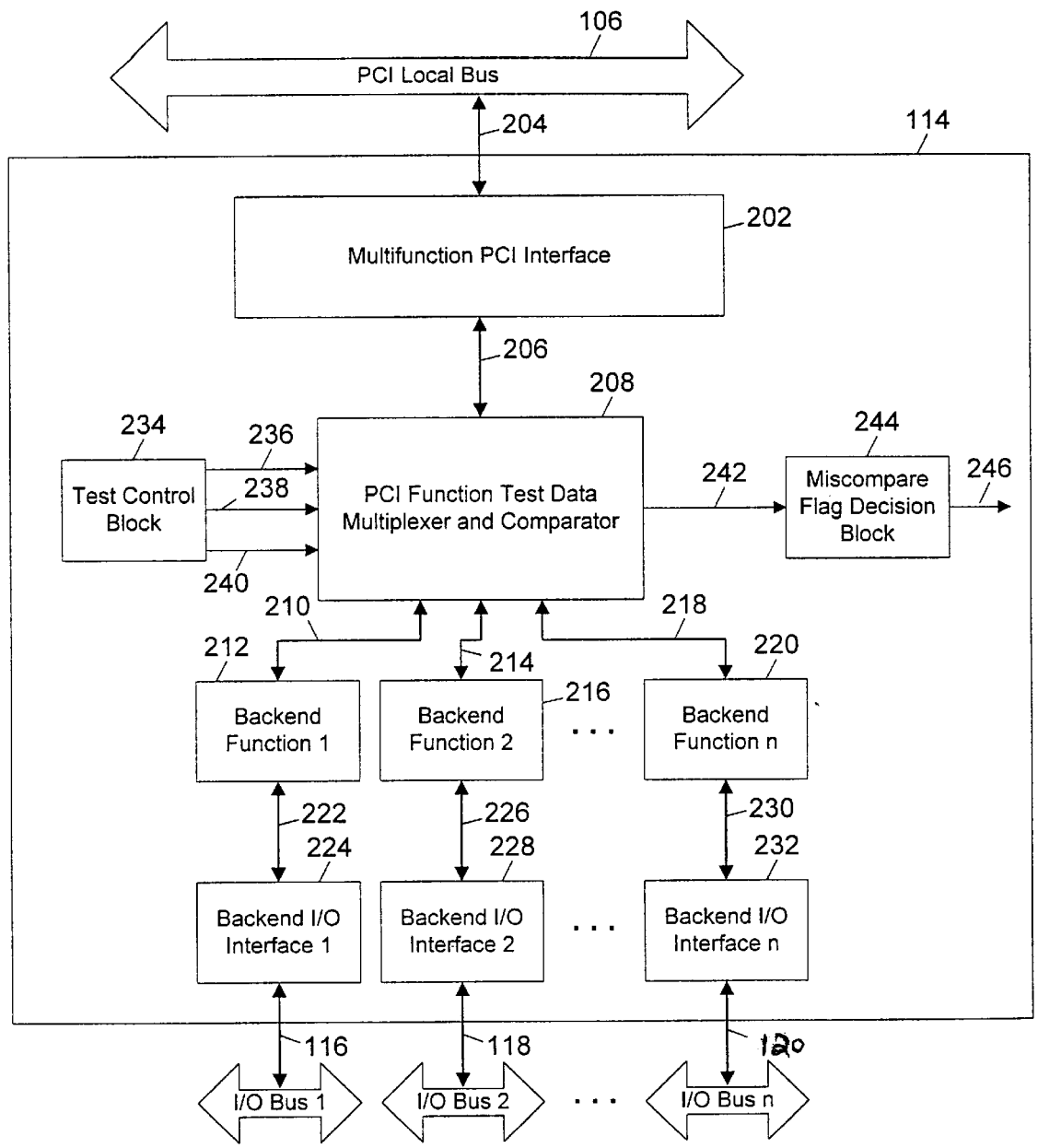
FIG. 2 is a functional block diagram of a multifunction PCI device in accordance with a preferred embodiment of the present invention.

Referring to FIG. 2, a functional block diagram of a multifunction PCI device in accordance with a preferred embodiment of the present invention is illustrated. Only so much of the logic within a multifunction PCI device which is necessary to practice the present invention is depicted, and those skilled in the art will recognize that additional logic may be incorporated into a multifunction PCI device in conjunction with the logic shown.

Multifunction PCI device 114 may be formed within a single integrated circuit or "chip" in accordance with the known art and includes PCI interface 202 connected by data/control signals 204 from PCI local bus 106. PCI interface 202 is connected by data/control signals 206 to PCI test data multiplexer/comparator 208, which is connected via data/control signals 210 to backend function 1 212, via data/control signals 214 to backend function 2 216, and via data/control signals 218 to backend function n 220. Backend function 1 212 is connected by data/control signals 222 to backend I/O interface 1 224, which is connected to function I/O bus 1 116. Similarly, backend function 2 216 is connected by data/control signals 226 to backend I/O interface 2 228, which is also connected to function I/O bus 2 118, while backend function n 220 is connected by data/control signals 230 to backend I/O interface n 232, connected in turn to function I/O bus n 120. PCI interface 202, backend functions 212, 216, and 220, and backend I/O interfaces 224, 228, and 232 may all be configured in accordance with the known art to operate in the same or similar manner as equivalent functional portions of existing multifunction PCI devices.

Multiplexer/comparator 208 also receives signals from test control block 234, including backend select signal 236, test mode signal 238, and send/receive signal 240. Multiplexer/comparator 208 provides a miscompare detected signals 242 to miscompare flag decision block 244, which may transmit signals corresponding to the miscompare flags via signal line 246 to a register or an external pin for multifunction PCI device 114.

Test control block 234 contains controllable registers and logic asserting the multifunction test mode and determining data flow direction between PCI interface 202 and backend functions 212, 216, and 220. The register bits and logic within test control block 234 also allows backend function data and control signals to be routed to the appropriate backend function.

When multifunction PCI device 114 is in test mode, multiplexer/comparator 208 performs at least two functions: (1) multiplexer/comparator 208 routes data and control signals to the appropriate backend function(s) within backend functions 212, 216, and 220 based on the direction of data flow through multifunction PCI device 114 (from PCI interface 202 to backend functions 212, 216 and 220 or vice versa); and (2) multiplexer/comparator 208 performs a data comparison between backend functions 212, 216, and 220 when data is received from functions I/O buses 116–120 for transfer to PCI local bus 106.

In the exemplary embodiment, function I/O buses 116–120 are similar buses (i.e., all conforming to the same standard and/or protocol, such as SCSI). Therefore backend functions 212, 216, and 220 may be duplicative, comprising large blocks of redundant functionality. One of the backend functions—for example, backend function 1 212—is selected as the "primary" function when multifunction PCI device 114 is in a test mode. Regardless of data direction during testing (either from PCI interface 202 to backend function 212, 216, and 220 or from backend functions 212, 216, and 220 to PCI interface 202), primary backend function 1 212 control and data signals are received from and transmitted to PCI interface 202. The remaining backend functions, backend function 2 216 through backend function n 220, receive the same signals from PCI interface 202 as does backend function 1 212, and receive these same signals during the same test clock cycles so that data from all backend functions is synchronized for the same clock cycle. During test vector generation, only control signals from backend function 1 212 are designated to respond to transmissions from PCI interface 202. Signals from all remaining functions, backend function 2 216 through backend function n 220, are received in parallel with the signals from backend function 1 212, but are merely compared to the signals from backend function 1 212. If differences are detected between the signals received from backend function 1 212 and any signals received from backend function 2 216 through backend function n 220, miscompare detected signal 242 is generated by multiplexer/comparator 208.

Miscompare detected signal 242 is routed to miscompare flag decision block 244 to be either registered or driven out to an external pin on the device. Miscompare detected signal 242 may be a single signal indicating a data error, or may be multiple signals identifying different possible data errors relating to each backend function other than primary function 212 (i.e., backend function 2 216 through backend function n 220). Miscompare flag decision block 244 may be minimal logic determining how the miscompare flag or flags are handled, whether registered or driven to an external pin.

Figure 3A:
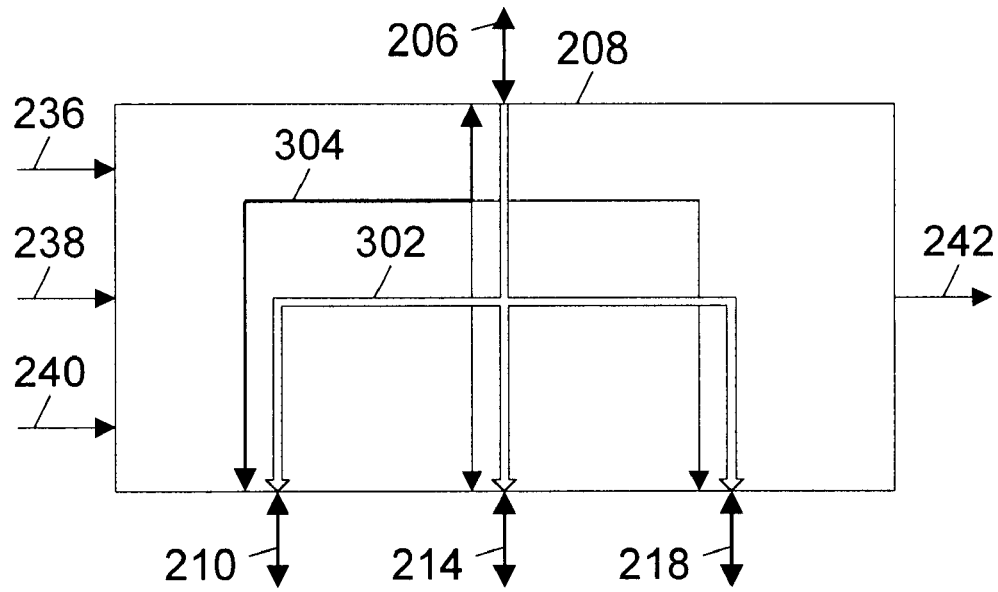
FIGS. 3A–3B depict diagrams of the data flow within a multiplexer/comparator for a multifunction PCI device in accordance with a preferred embodiment.
Figure 3B:
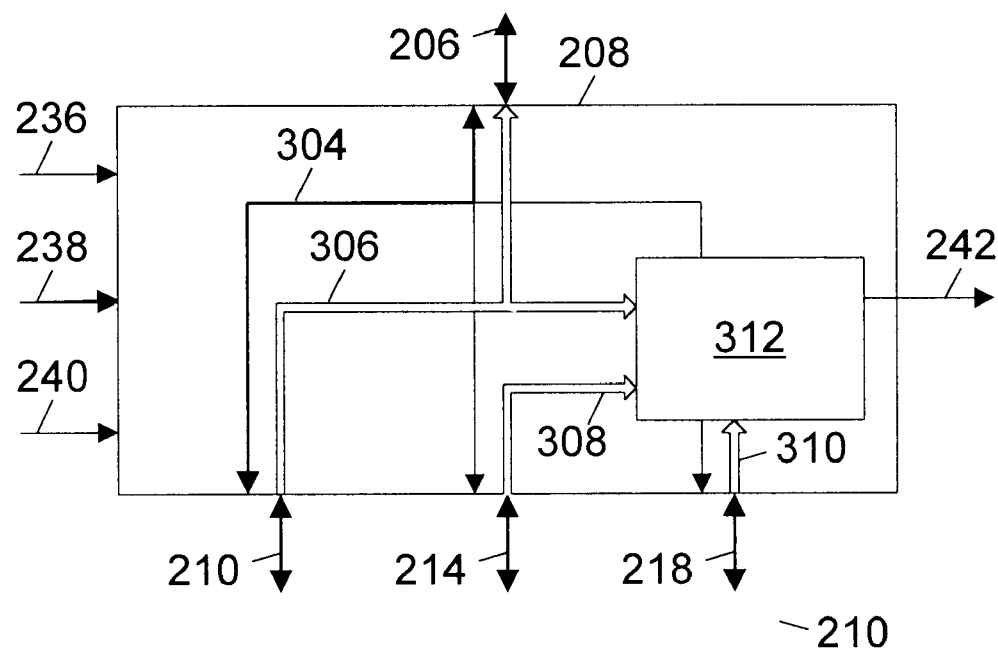

With reference now to FIGS. 3A and 3B, diagrams of the data flow within a multiplexer/comparator for a multifunction PCI device in accordance with a preferred embodiment of the present invention are depicted. FIG. 3A depicts data flow within multiplexer/comparator 208 for data transfers from PCI interface 202 to backend functions 212, 216, and 220 depicted in FIG. 2. Identical data 302 and control signals 304 are presented to each backend function 212, 216, and 220 when the direction of data flows from the PCI bus 106 to the function I/O buses 116–120 (also depicted in FIG. 2) during testing. Backend function 1 212 acts as the only interface to PCI interface 202, controlling all of the backend handshaking. The remaining backend functions, backend function 2 216 through backend function n 220, merely act as a receiver of data and control signals. No data comparisons need be made in this mode of operation since each backend function receives the identical signals.

FIG. 3B depicts data flow within multiplexer/comparator 208 as data is presented at each function I/O bus 116–120 for transfer to PCI bus 106 depicted in FIG. 2. Backend function 1 212 continues to act as the primary interface to PCI interface 202 in this mode of operation, with the data 306 from backend function 1 212 being transferred through to PCI interface 202. Data 308 and 310 for all remaining backend functions, backend function 2 216 through backend function n 220, is tapped by comparator 312 within multiplexer/comparator 208 and compared to the data 306 from backend function 1 212. Any miscompare to the primary data is flagged as an error and a flag or flags are accordingly generated.

The test time required to test any design with high gate counts is proportional to the number of test vectors which must be run. Multifunction PCI I/O devices with large redundant functional blocks, such as those including identical backend functions, may reduce the number of test vectors with minimal additional test circuitry by testing the redundant functional blocks in parallel. Incoming data from the PCI local bus is sent to each backend function in parallel, with only one (primary) backend channel providing the requisite handshaking. The reverse direction for the data path is tested by permitting each I/O channel to read the data from their respective buses for comparison. Internal comparators flag any miscompared data before data from the primary backend function is sent out over the PCI local bus. The data miscompare flag(s) may be either registered or sent out on an external test pin.

The parallel testing of multiple identical backend functions in the present invention reduces the total number of test patterns (or "test vectors") required to test all backend functions in a multifunction PCI device, thus reducing total testing time. The reduction in testing time leads to a corresponding reduction of total unit cost per device. This testing scheme is easy to implement and has a production value which increases in proportion to the size of internal data buffers utilized within a multifunction PCI device and the number of backend channels supported by the device.

The present invention also provides a number of additional benefits to the overall testing of a multifunction PCI device. First, data from multiple backends may be tested simultaneously before reaching the PCI bus. Since only one (primary) backend function may be a PCI bus master during testing, the parallel testing technique of the present invention reduces the arbitration overhead required to select between individual backends. Second, by placing each function I/O bus in the same data direction state (configuring all of the buses as either an input or an output) in the same test clock cycle, the number of possible combinations of I/O are reduced and waveform control memory (WCM) is also significantly reduced. A common problem with multiple data buses of large sizes (16-bit, 32-bit, 64-bit, etc.) is the generation of WCM. WCM defines the I/O direction and waveform type for each individual pin in a test vector during each test cycle. The I/O direction of a bidirectional data pin can be defined as one of three states (input, output, or tristate). The waveform type of that pin defines the actual physical characteristic or behavior of the type of signal the tester drives onto the pin when configured as an input.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of testing a device connected to a first bus and to a plurality of additional buses, the method comprising:

selecting a bus from the plurality of additional buses as a primary bus, leaving a plurality of unselected buses within the plurality of additional buses;

receiving data in parallel from the plurality of unselected buses;

comparing data received in parallel from the plurality of unselected buses to data from the primary bus; and detecting differences between data from the primary bus and data from the plurality of unselected buses.

2. The method of claim 1, further comprising:

responsive to detecting differences between data from the primary bus and data from the plurality of unselected buses, setting a flag.

3. The method of claim 2, wherein the step of setting a flag further comprises:

setting a flag in a register.

4. The method of claim 2, wherein the step of setting a flag further comprises:

transmitting a flag to an external pin for the device.

5. The method of claim 1, wherein the step of selecting a primary bus further comprises:

selecting the primary bus from among the plurality of additional buses, wherein the plurality of additional buses are similar.

6. The method of claim 5, wherein the step of selecting a primary bus further comprises:

selecting the primary bus from among the plurality of additional buses, wherein the plurality of additional buses are each SCSI buses.

7. The method of claim 1, wherein the step of transferring data from the primary bus to the first bus further comprises:

transferring control signals from the primary bus to the first bus.

8. The method of claim 1, further comprising:

transferring data from the first bus to each of the plurality of additional buses.

9. The method of claim 8, wherein the step of transferring data from the first bus to the plurality of additional buses further comprises:

transferring data from a PCI local bus to a plurality of SCSI buses.

10. The method of claim 1, wherein the step of transferring data from the first bus to the plurality of additional buses further comprises:

transferring control signals from the primary bus to the first bus.

11. The method of claim 1, wherein the step of comparing data from the plurality of unselected buses to data from the primary bus precedes the step of transferring data from the primary bus to the first bus.

12. The method of claim 1, wherein the step of comparing data from the plurality of unselected buses to data from the primary bus further comprises:

comparing synchronized data from the plurality of unselected buses with synchronized data from the primary bus.

13. The method of claim 1, further comprising:

synchronizing data transfers between the first bus and the plurality of additional buses.

14. A multifunction device, comprising:

a first interface to a first bus;

a plurality of additional interfaces connected to additional buses;

a multiplexer selecting a primary bus from the additional buses and leaving a plurality of unselected buses within the additional buses, the multiplexer selecting the primary bus for testing data transfers from the additional buses to the first bus, the multiplexer routing data transfers from the primary bus through an interface within the plurality of additional interfaces and the first interface to the first bus; and a comparator comparing data received in parallel through the plurality of additional interfaces from the plurality of unselected buses to data received through one of the plurality of additional interfaces from the primary bus.

15. The device of claim 14, wherein the comparator generates a flag upon detection of differences between data from the primary bus and data from a bus within the plurality of unselected buses.

16. The device of claim 14, wherein the plurality of additional interfaces further comprise interfaces connected to a plurality of SCSI buses.

17. The device of claim 14, further comprising:

a test control block signaling the multiplexer to select the primary bus for testing of the additional buses.

18. The device of claim 14, further comprising:

a miscompare flag decision block storing the flag in a register.

19. The device of claim 14, further comprising:

a miscompare flag decision block transmitting the flag to an external pin for the device.

20. A multifunction device, comprising:

a first interface to a first bus, wherein the first interface comprises an interface to a PCI local bus;

a plurality of additional interfaces connected to additional buses;

a multiplexer selecting a primary bus from the additional buses and leaving a plurality of unselected buses within the additional buses, the multiplexer selecting the primary bus for testing data transfers from the additional buses to the first bus, the multiplexer routing data transfers from the primary bus through an interface within the plurality of additional interfaces and the first interface to the first bus; and a comparator comparing data received in parallel through the plurality of additional interfaces from the plurality of unselected buses to data received through one of the plurality of additional interfaces from the primary bus.

21. A multifuntion device, comprising:

a first interface to a first bus;

a plurality of additional interfaces connected to additional buses;

a multiplexer selecting a primary bus from the additional buses and leaving a plurality of unselected buses within the additional buses, the multiplexer selecting the primary bus for testing data transfers from the additional buses to the first bus, the multiplexer routing data transfers from the primary bus through an interface within the plurality of additional interfaces and the first interface to the first bus;

a comparator comparing data received in parallel through the plurality of additional interfaces from the plurality of unselected buses to data received through one of the plurality of additional interfaces from the primary bus and a plurality of backend functions between the plurality of additional interfaces and the multiplexer, each backend function within the plurality of backend functions converting data from a first protocol for the first bus to a second protocol for the primary bus.

22. A multifunction device, comprising:

a first interface to a first bus; and a plurality of backend interfaces to backend buses, wherein the multifunction device has a first mode of operation in which data is transferred from the first interface to a single, selected backend interface within the plurality of backend interfaces and from the single, selected backend interface within the plurality of backend interfaces to the first interface; and wherein the multifunction device has a second mode of operation in which data is transferred simultaneously from the first interface to each backend interface within the plurality of backend interfaces, return data from the single selected backend interface within the plurality of backend interfaces is compared to return data received in parallel from plurality of unselected backend interfaces within the plurality of backend interfaces, a flag is generated upon detection of differences between return data from the single selected backend interface and return data from the plurality of unselected interfaces, and return data is transferred from the single selected backend interface to the first interface.

23. The multifunction device of claim 22, wherein the first mode of operation is a normal mode of operation.

24. The multifunction device of claim 22, wherein the second mode of operation is a test mode of operation.

25. The multifunction device of claim 22, further comprising:

a test control block switching the multifunction device between the first and second modes of operation.

26. A data processing system comprising:

a processor connected to a local bus;

a multifunction device connected to the local bus and to a plurality of backend I/O buses, the multifunction device including:

an interface to the local bus;

a plurality of backend interfaces to a plurality of backend I/O buses;

a multiplexer selecting a primary bus from the plurality of backend buses for testing data transfers from the plurality of backend buses to the local bus, the multiplexer routing data transfers form the primary bus to the local bus through an interface within the plurality of backened interfaces and the interface; and a comparator comparing data received in parallel through the plurality of backend interfaces, the comparator detecting differences between data received from any other bus within the plurality of backend I/O buses.

27. The data processing system of claim 26, wherein the comparator generates a flag upon detection of differences between data from the primary bus and data from any other bus within the plurality of backend I/O buses.

28. A data processing system comprising:

a processor connected to a local bus, wherein the local bus is a PCI local bus;

a multifunction device connected to the local bus and to a plurality of backend I/0 buses, the multifunction device including:

an interface to the local bus;

a plurality of backend interfaces to a plurality of backend I/0 buses;

a multiplexer selecting a primary bus from the plurality of backend buses for testing data transfers from the plurality of backend buses to the local bus, the multiplexer routing data transfers form the primary bus to the local bus through an interface within the plurality of backened interfaces and the interface; and a comparator comparing data received in parallel through the plurality of backend interfaces, the comparator detecting differences between data received from any other bus within the plurality of backend I/O buses.

29. An apparatus comprising:

an interface to a first bus;

a plurality of backend functions;

a primary backend function;

a plurality of interfaces providing communication between primary backend function and the plurality of functions and a plurality of buses; and a multiplexer and comparator unit connected to the primary backend function and a plurality of backend functions, wherein during a test mode, the multiplexer and comparator unit performs a data comparison of data received in parallel from all of the plurality of backend functions to data received from the primary backend function to determine if a difference in data is present and wherein the multiplexer and comparator unit generates a signal indicating the difference in data in response to a determination that the difference in data is present.

30. The apparatus of claim 29, wherein data is data received from the plurality of interfaces for transfer to the interface to the first bus.

31. The apparatus of claim 29, wherein the multiplexer and compare unit includes another mode in which data is routed to and from a selected backend function selected from the primary backend function and the plurality of backend functions in routing data to and from the interface to the first bus.

32. The apparatus of claim 29, wherein the interface to the first bus in an interface to a PCI bus.

33. The apparatus of claim 29, wherein the backend function and the plurality of backend functions convert data from a first protocol for the first bus to a second protocol for the primary bus and the plurality of buses.

34. A method for testing a multifunction device having a plurality of backend functions used to transfer data top and from input/output channels connected to the multifunction device, the method comprising:

selecting a backend function from the plurality of backend functions as a primary backend function, wherein remaining backend functions other than the primary backend function are secondary backend functions;

simultaneously testing all of the input/output channels in parallel by sending test data to all of the input/output channels through the primary backend function and the secondary backend functions during a clock cycle; and receiving input data from the input/output channels in parallel and comparing the input data from the input/output channels associated with the secondary backend functions to the input data from the input/output channel associated with the primary backend function to determine whether a difference in the input data occurs.

* * * * *